United States Patent
Pinto et al.

[15] 3,662,957
[45] May 16, 1972

[54] LOW FRICTION TRACK BEARING ASSEMBLY

[72] Inventors: James C. Pinto, Hartford; Ransom S. Thompson, Middle Haddam, both of Conn.

[73] Assignee: United Aircraft Corporation, East Hartford, Conn.

[22] Filed: Oct. 28, 1970

[21] Appl. No.: 84,719

[52] U.S. Cl. .............................239/265.39, 60/242, 308/6 R
[51] Int. Cl. ..............................................................B64c 15/06
[58] Field of Search ..................239/265.11, 265.33, 265.37, 239/265.39; 60/242; 308/6 R

[56] References Cited

UNITED STATES PATENTS

| | | | |
|---|---|---|---|
| 2,910,829 | 11/1959 | Meyer | 239/265.39 X |
| 2,972,226 | 2/1961 | Geary | 239/265.39 |
| 3,044,258 | 7/1962 | Carlton et al. | 239/265.39 X |
| 3,098,352 | 7/1963 | Taub et al. | 239/265.37 X |
| 3,386,248 | 6/1968 | Pike et al. | 239/265.33 X |

*Primary Examiner*—M. Henson Wood, Jr.
*Assistant Examiner*—Michael Y. Mar
*Attorney*—Shenier & O'Connor

[57] ABSTRACT

A low friction track bearing assembly which is supported on a stationary member such as a jet engine housing for movement around an axis which is perpendicular to the axis of rotation of the first bearings, which are adapted to engage the cam track base of a guide channel in a member such as an iris nozzle section driven in a linear direction through a pivotal connection constraining the member to move around an axis perpendicular to the direction of drive, and parallel to the axes of bearings offset from the first bearings and adapted to engage the straight sides of the channel to permit the member to be driven in the desired linear direction without undue resistance owing to misalignment between the bearing assembly and the channel.

9 Claims, 11 Drawing Figures

Patented May 16, 1972

INVENTORS
James C. Pinto
Ransom S. Thompson
BY Shenier & O'Connor
ATTORNEYS

Patented May 16, 1972

INVENTORS
James C. Pinto
Ransom S. Thompson
BY
Shenier & O'Connor
ATTORNEYS

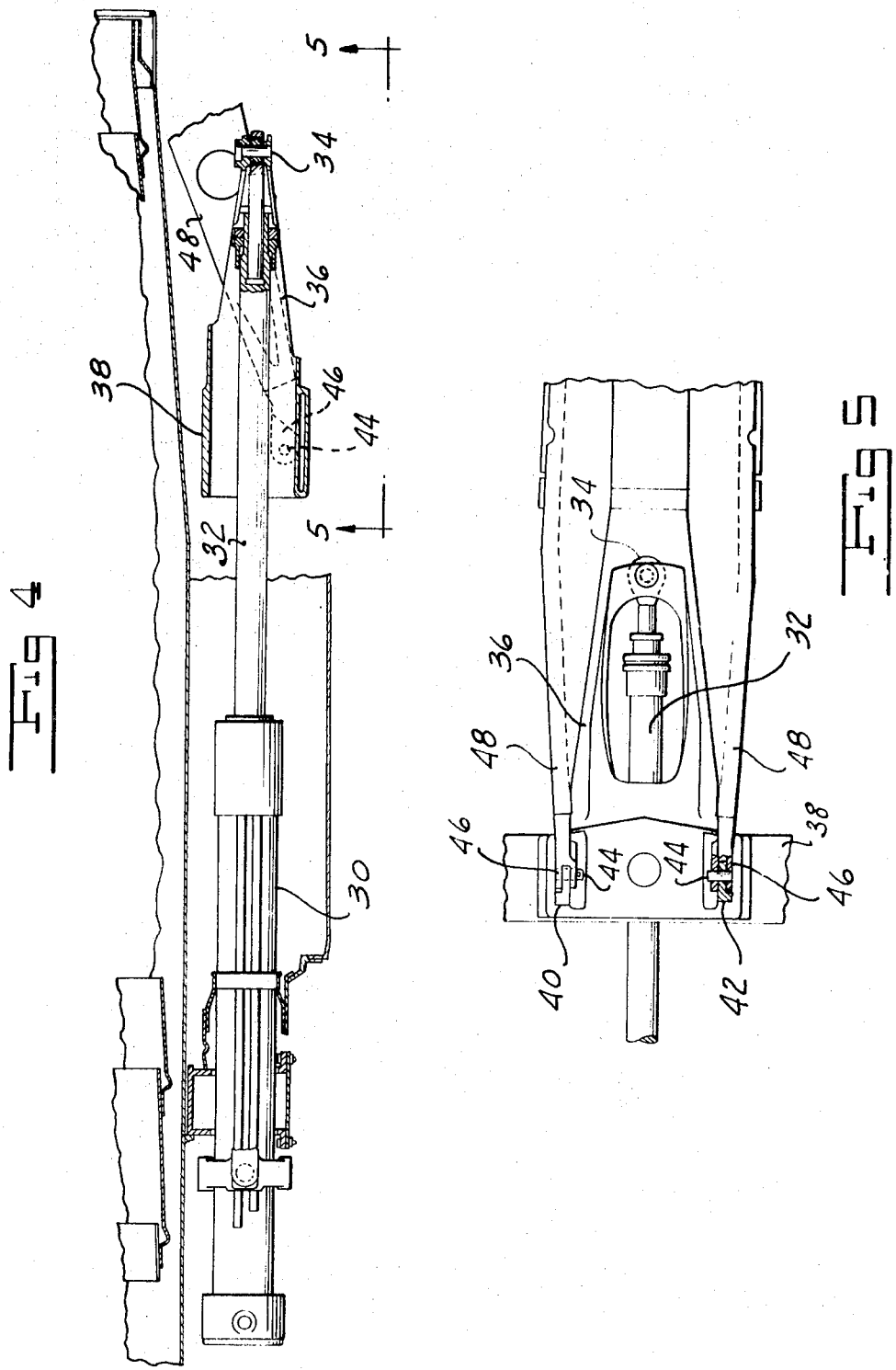

Patented May 16, 1972
3,662,957
5 Sheets-Sheet 4
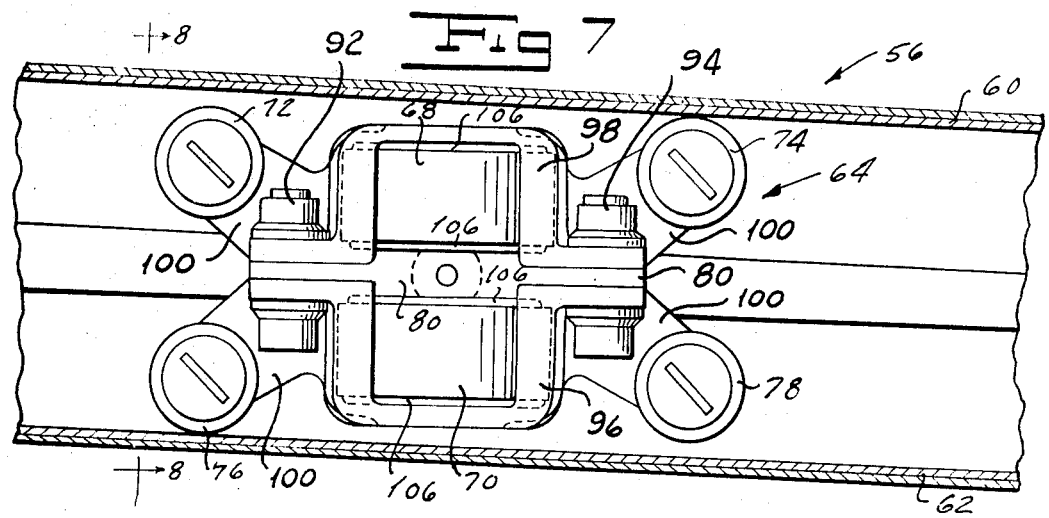
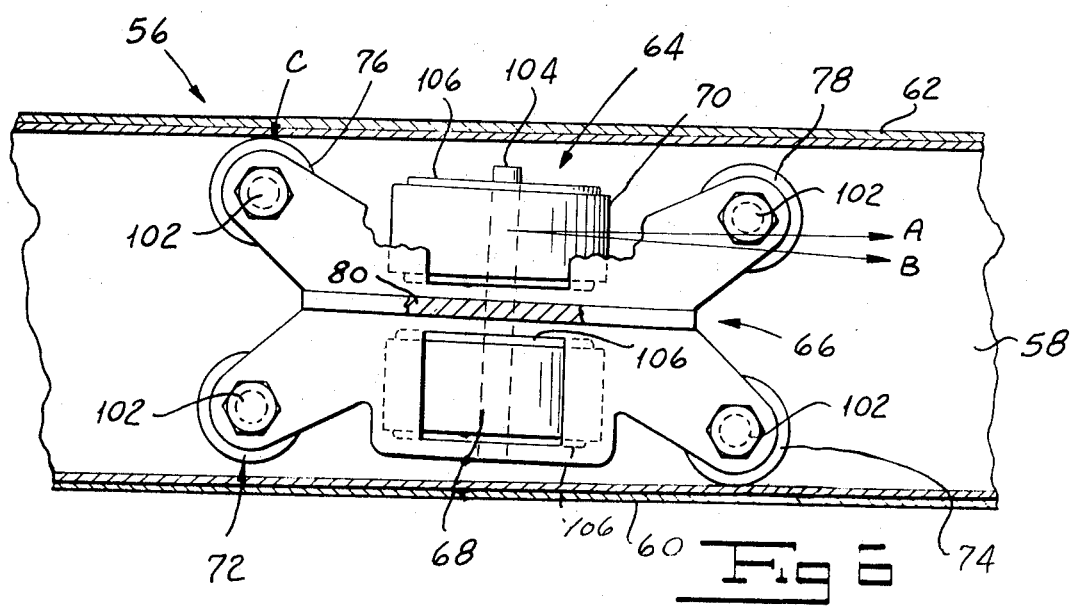
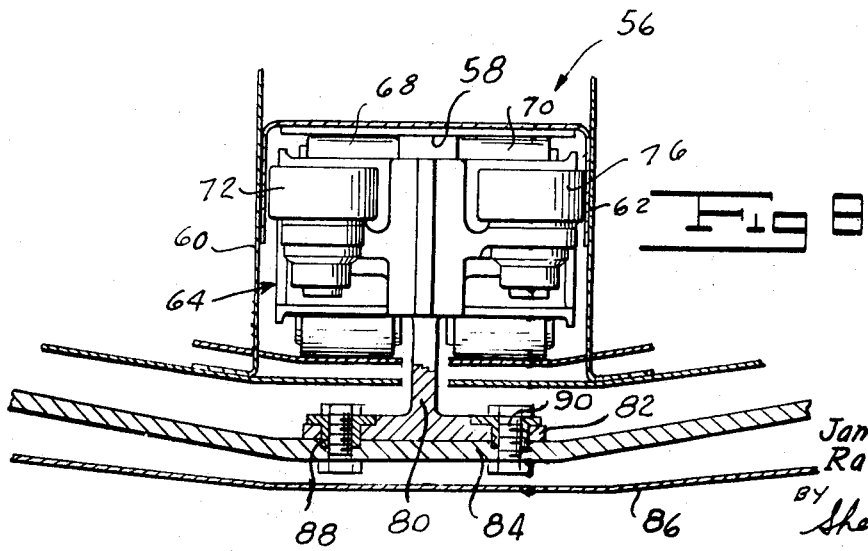
INVENTORS
James C. Pinto
Ransom S. Thompson
BY
Shenier & O'Connor
ATTORNEYS Patented May 16, 1972

INVENTORS
James C. Pinto
Ransom S. Thompson
BY Stevens & O'Connor
ATTORNEYS

LOW FRICTION TRACK BEARING ASSEMBLY

The invention herein described was made in the course of or under a contract with the Department of the Navy.

BACKGROUND OF THE INVENTION

Modern jet engines employ iris type exhaust nozzles comprising a plurality of individual sections all of which are pivotally connected to a unison ring which is driven in the direction of its axis when the size of the opening provided by the iris nozzle is to be changed. A plurality of guide bearing assemblies associated with the respective nozzle sections and mounted on the engine frame ride in tracks formed in the nozzle sections. The guide channels have configurations which cause the nozzle sections to pivot radially inwardly or outwardly as the sections are driven by the unison ring. It is desirable that friction and resistance to changing of the nozzle aperture be kept to a minimum.

Assemblies of the prior art involve the defect that if the channel and the bearing assembly are misaligned excessively high forces are generated by the bearings and the resistance to movement of the iris section in the desired linear direction is excessive.

We have invented a bearing assembly which overcomes the defect of track bearing assemblies of the prior art described hereinabove. Our bearing assembly accommodates misalignment between the assembly and the guide track without developing excessive resistance to movement between track and the bearing assembly. Our assembly overcomes this problem in a simple and expeditious manner.

SUMMARY OF THE INVENTION

One object of our invention is to provide a low friction track bearing assembly which is an improvement over track bearing assemblies of the prior art.

Another object of our invention is to provide a low friction track bearing assembly which can accommodate misalignment between the assembly and the track.

Yet another object of our invention is to provide a low friction track bearing assembly which overcomes a defect of assemblies of the prior art in a simple an expeditious manner.

Other and further objects of our invention will appear from the following description.

In general, our invention contemplates the provision of a low friction track bearing assembly which is supported on a stationary member such as a jet engine housing for movement around an axis which is perpendicular to the axis of main bearings adapted to ride along a cam track formed in the base of a guide channel and parallel to the axes of offset auxiliary bearings adapted to engage the channel sides. Our assembly is especially adapted for use in guiding an iris nozzle section of a jet engine or the like.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is a fragmentary sectional view of the engine shown in FIGS. 1 and 2 taken along the line 3—3 of FIG. 2.

FIG. 4 is a fragmentary sectional view of the engine shown in FIG. 2 taken along the line 4—4 of FIG. 2.

FIG. 5 is a fragmentary view off the engine shown in FIG. 1 taken along the line 5—5 of FIG. 4.

FIG. 6 is a sectional view of our low friction track bearing assembly illustrating its relationship to a guide channel, taken along the line 6—6 of FIG. 3, and drawn on an enlarged scale.

FIG. 7 is a top plan view of our low friction bearing assembly taken along the line 7—7 of FIG. 3 and drawn on an enlarged scale.

FIG. 8 is an end elevation of our low friction bearing assembly taken along the line 8—8 of FIG. 7.

DESCRIPTION OF THE PREFERRED EMBODIMENT

Figure 1:
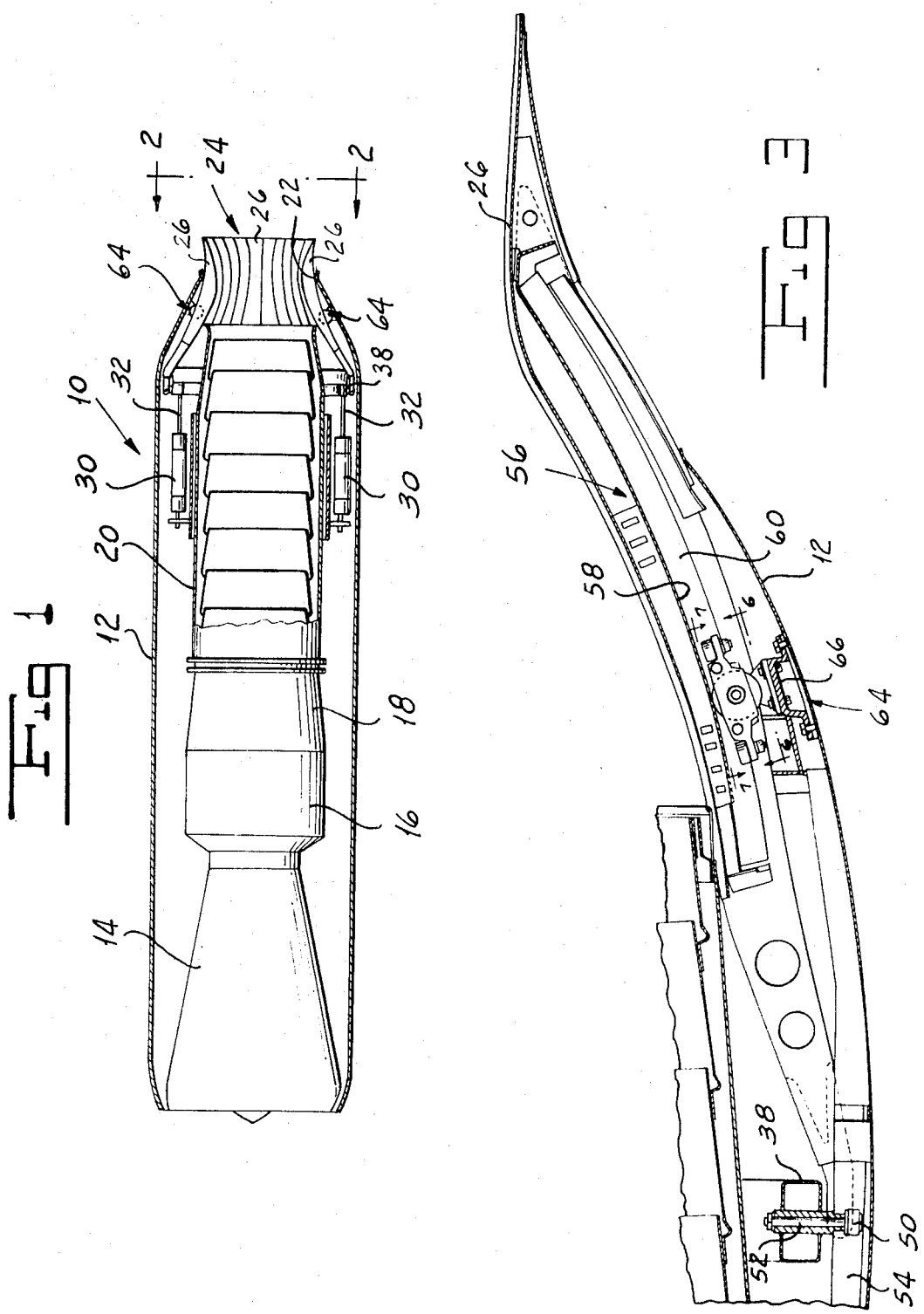
FIG. 1 is a sectional view of a jet engine which may be provided with our low friction track bearing assembly.
Figure 2:
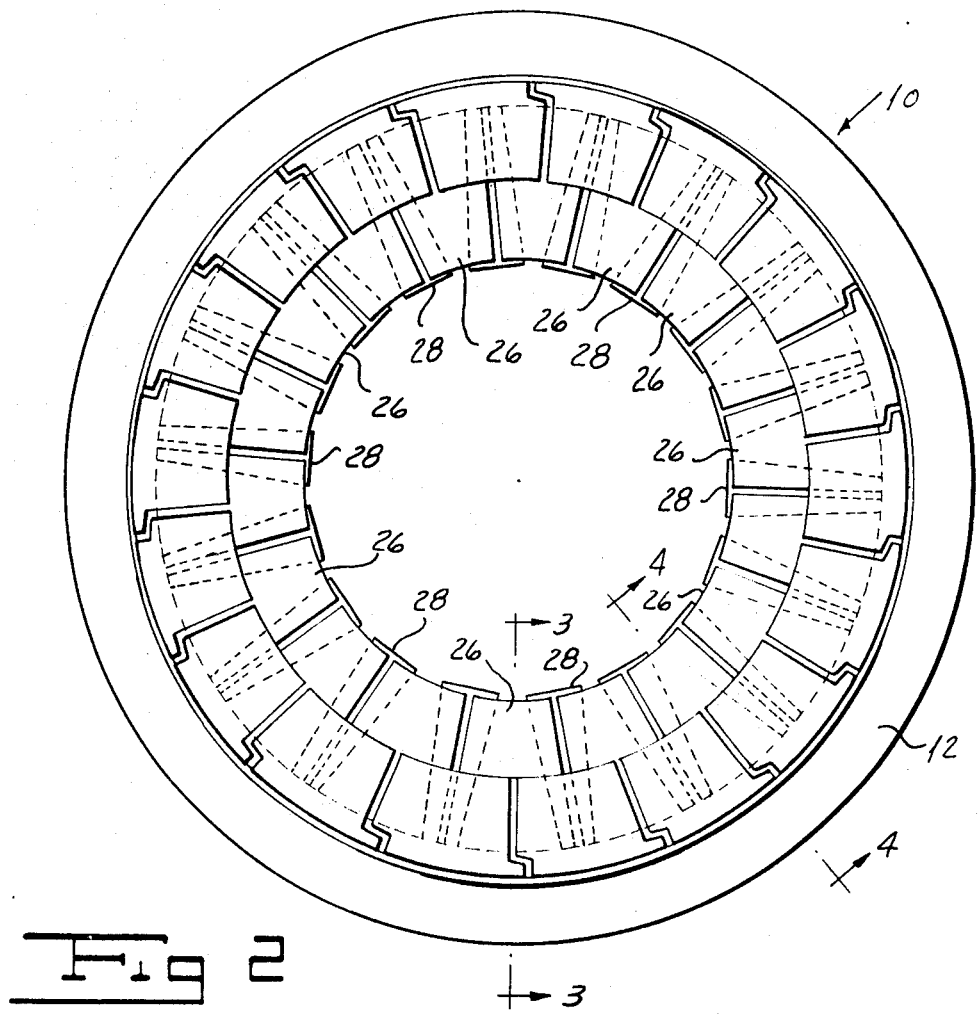
FIG. 2 is a rear elevation of the engine shown in FIG. 1 taken along the line 2—2 of FIG. 1 and drawn on an enlarged scale.

Referring now to FIGS. 1 to 8 a jet engine, indicated generally by the reference character 10, is provided with a housing 12 for a compressor section 14, a combustion section 16, a turbine section 18, and an afterburner section 20. Within the housing 12 adjacent the exhaust opening 22 thereof, we provide an iris nozzle indicated generally by the reference character 24 comprising a plurality of sections which sections are in a manner to be described adapted to be moved linearly in the direction of the housing 12 while at the same time being swung radially toward and away from each other to vary the size of the exhaust opening. In the condition shown in FIG. 2 the minimum diameter opening is formed by the sections. When they are actuate in a manner to be described to enlarge the exhaust opening the edges of adjacent sections diverge.

In order to prevent exhaust gases from escaping radially between the edges of adjacent sections we provide auxiliary flaps 28 which overlap the adjacent edges of adjacent sections 26 and which cover the openings which otherwise would exist when the sections 26 are moved to enlarge the exhaust opening. These auxiliary flaps may be of any suitable type known to the art and may be connected to sections 26 in any suitable manner which causes them to move therewith while permitting adjacent edges of sections 26 to diverge. Since these auxiliary flaps do not, per se, form any part of our invention they will not be described in detail.

Further as is known in the art, each of the sections 26 is adapted to be moved in the direction of the axis of the housing 12 while at the same time pivoting so that the aft ends thereof move radially inwardly or outwardly. We provide the engine 10 with a plurality of piston and cylinder units 30 such for example as four units each of which has a piston rod 32 extending rearwardly of the assembly to a pivot pin 34 carried by a rearward extension 36 on a unison ring 38 which extends around the periphery of the after-burner section 20.

We pivotally connect each of the sections 26 to the ring 38 so that as the ring 38 is driven in the direction of the axis of housing 12 the sections 26 move linearly in unison with the ring. For this purpose ring 38 carries pairs of spaced lugs 40 and 42 which receive respective pins 44 which extend through bifurcations 46 in the ends of arms 48 on the forward portions of sections 26. We also provide ring 38 with a plurality of rollers 50 carried by pins 52 and adapted to ride in guide tracks 54 carried by the frame or housing 12 of the engine to guide the ring in its movement.

As has been explained hereinabove, each of the sections 26 is to be moved pivotally about the axis of its associated pins 44 as the ring 38 is moved forwardly and rearwardly. We provide the interior of each of the sections 26 with a guide channel indicated generally by the reference character 56 having a curved base 58 and straight sides 60 and 62.

Each channel 56 receives a roller bearing assembly indicated generally by the reference character 64 to control the pivotal movement of the corresponding section 26 as it moves axially of the housing 12. A pedestal assembly 66 or the like secured to the housing 12 mounts the assembly 64 on the housing. Pedestal assembly 66 supports a first pair of roller bearings 68 and 70 on which the base 58 of the channel 56 rides. A first pair of side guide rollers 72 and 74 supported for movement around spaced axes generally perpendicular to the common axis of bearings 68 and 70 are adapted to engage the channel side 60 to guide the section 26 in its linear component of movement. A second set of side guide roller bearings 76 and 78 offset from and generally perpendicular to the axis of rotation of rollers 68 and 70 are adapted to engage side 62 to guide section 26 in its linear component of movement. It will be seen that the axes of the set of rolls 72 and 74 are offset to one side of the center line of the assembly 64 while the axes of the other set of rolls are offset to the other side of the center line.

More specifically, the pedestal assembly 66 includes a central bearing support 80 extending upwardly from a base 82 secured to a support 84 carried by the housing 86. Any suitable means such as bolts 88 and 90 may be employed for this purpose. The upright 80 extends through an opening in the cover of the channel to permit the rollers 68 and 70 to ride on the base 58 of the channel 56.

Any suitable means, such for example as bolts 92 and 94, secure a pair of outer baring supports 96 and 98 to the central support 80. Each of the outer supports 96 and 98 is provided with a pair of arms 100. Each arm carries a stationary shaft 102 on which the inner ring of one of the respective bearings 72, 74, 76 and 78 is mounted. Similarly, we mount the inner rings of each of the bearings 68 and 70 on a stationary shaft 104 extending through the supports 80, 96 and 98. As is known in the art, each of the roller bearing assemblies 68 and 70 includes a pair of end plates 106 which in normal operation of the bearing are out of contact with the outer ring thereof.

In structures of the prior art wherein there is some misalignment between the bearing assembly 64 and the axis of the channel 56, movement of the channel relative to the bearing assembly generates forces which result in excessive friction and which may cause damage to the parts of the assembly. Considering such a condition in connection with our assembly, let us assume, as illustrated in FIG. 6, that some small misalignment exists and that the section 26 is driven in the direction of the arrow A. Under these conditions, the section will be forced to move in accordance with the direction of the rollers 68 and 70 as indicated by the arrow B. The section thus is forced to move sidewise until one of the side rollers such as roller 76 contacts side 62 of the channel at point C, for example. If, under this condition, axial travel were continued and the pedestal assembly 66 were rigidly secured to its support, any attempt to move the section further would result in two opposing forces tending to guide the section. First, the main roller tends to continue to guide the section in the direction B while the side roller 76 tends to constrain the section to move in the direction of the arrow A which is parallel to the side of the channel. With such continued motion, equal and opposite loads occur between the side roller and the main rollers. The side roller develops a load radial to its own axis in preventing lateral motion of the section. The main rollers by their nature offer low rolling resistance to motion in a single precise direction and high sliding resistance to motion in all other directions. Owing to that fact, they develop a transverse load acting parallel to the axis of the main bearings and in a direction opposite to the load on the side rollers. The origins of the lateral forces on the main rollers are at the places of contact between the outer bearing races and the channel base 58. Lateral slippage continuously occurs at these locations as motion progresses. The force required to maintain this slippage is the coefficient of sliding friction times the radial load on the main bearings 68 and 70. In the nozzle application which I have illustrated in the drawings, the radial loading is the gas loading on the nozzle panel. The magnitude of the resultant load on the main bearings 68 and 70 is independent of the amount of slippage and develops even with infinitesmal slipping resulting from the slightest misalignment.

The lateral load described above on the outer races of bearings 68 and 70 forces the outer races against their associated end plates 106 which are rigidly attached to the assembly 66. Thus the end plates 106 act as "disc brakes." They require that a force having a magnitude of the coefficient of sliding friction times the lateral load be supplied at the radius of contact between the outer races and the end plates 106. The torque required manifests itself as a drag load on the unison ring 38 necessitating a heavier and more rugged system if nozzle actuation is to be insured and damage to the parts is to be avoided.

In structures of the prior art wherein one or more side guide rollers have axes which pass through the common axis of the rollers 68 and 70, such a condition cannot be corrected and either excessive friction or damage to the parts will follow.

It is to be noted that other expedients such as using low friction coatings or using auxiliary rolling elements or reducing the radius at which end plates 106 contact bearing races 68 or 70 to a minimum might alleviate the condition in some degree, but in hot unlubricated installations such as that which I have described our system provides a much more satisfactory solution.

As is pointed out hereinabove, we offset our side guide rollers 72, 74, 76 and 78 from the axis of the cam rollers 68 and 70. Owing to that fact, a torque is produced on the assembly 64 tending to rotate it in such a direction as will correct the misalignment between the track and the bearing assembly. We take advantage of this torque by mounting the assembly 64 on the support 84 in such a way as permits relative rotational movement to reduce the torque resulting from the action of the side guide rollers described hereinabove. In one embodiment of our invention we may make at least the portion of the center guide 80 extending from base 82 from a material which is sufficiently torsionally resilient to accommodate the torque. By way of example, this part of the assembly may be formed from titanium.

We have provided pairs of rollers 72 and 74 and 76 and 78 at the respective sides of assembly 64 to accommodate both directions of movement of the iris section with relation to the assembly.

Figure 9:
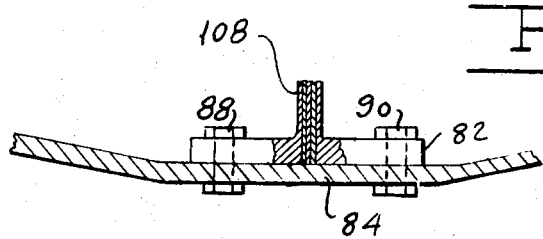
FIG. 9 is a fragmentary sectional view of an alternate form of our low friction track bearing assembly.

Alternatively to forming the center support 80 from inherently resilient material as shown in FIG. 8 we may laminate the part as indicated in FIG. 9 at 108. As a further alternate we may provide the base 82 with a vertical pivot 110 rotatably received in a bushing 112 or the like in the support 84. All that is required is that the torque described above be able to be relieved by rotational movement within the connection between the assembly 64 and the support 84.

Figure 11:
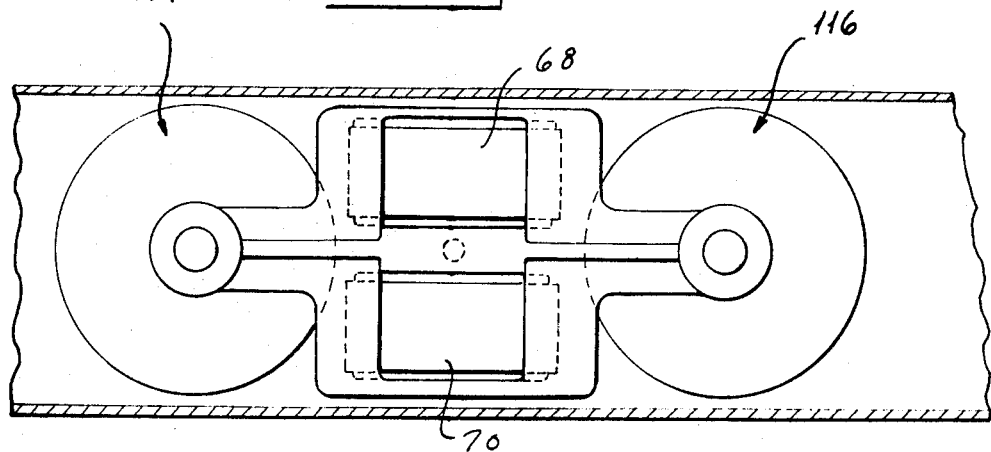
FIG. 11 is a plan view of yet a further form of our low friction bearing assembly illustrating its relationship to a guide track.

As a further alternative, rather than using two sets of side guide rollers we may employ only two rolls 114 and 116 as illustrated in FIG. 11. Such rolls must have diameters which are sufficiently great that each cooperates with either side 60 or 62 of the channel.

The operation of our assembly will be apparent from the description given hereinabove. As the ring 38 is driven forward or rearward the sections 26 move correspondingly. At the same time the bases 58 of the guide channels 56 act on the rollers 68 or 70 to swing the sections 26 around the axis of the pairs of pins 44. Where the ring 38 is driven rearward the after ends of the sections 26 move toward each other to reduce the size of the exhaust opening. Conversely, when the ring is moved forward the size of the exhaust orifice is increased.

Figure 10:
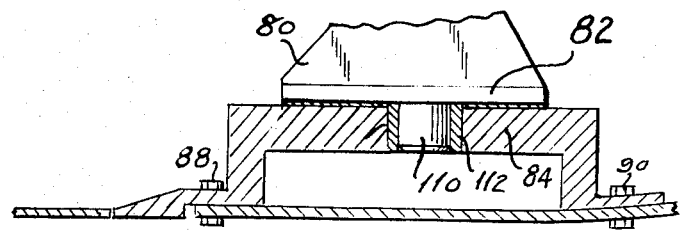
FIG. 10 is a fragmentary elevation with parts in section of a further form of our low friction track bearing assembly.

Under the conditions described above if any misalignment exists between the orientation of the assembly 64 and the longitudinal axis of its associated guide channel 56 side rollers 72, 74, 76 and 78 cooperate with the channel sides 60 and 62 to produce a torque on the pedestal 66. Each form of our invention is constructed so as to relieve this torque thus to prevent buildup of excessive forces which otherwise would result. In FIG. 8 the inherent resiliency of the upright 80 permits it to twist to accommodate misalignment. Similarly the laminated upright 108 of FIG. 9 may twist. In the arrangement of FIG. 10 the entire pedestal may pivot around the axis of pin 110.

In the form of our invention shown in FIGS. 6 and 7 we have shown a pair of side guide rollers on each side of the assembly 64. Alternatively as shown in FIG. 11 we may use only two side guide rolls 114 and 116 each of which having a sufficiently great diameter that it can cooperate with either side 60 or 62 of the channel 56.

It will be seen that we have accomplished the objects of our invention. We have provided a track bearing assembly which is an improvement over track bearing assemblies of the prior art. Our assembly is especially adapted for use in hot unlubricated installations. It accommodates misalignment between the track and the bearing structure. It obviates excessive forces which otherwise would result from such misalignment.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a jet engine having a frame and a variable area nozzle comprising a plurality of sections each mounted for linear movement in a certain direction and for pivotal movement at right angles to said certain direction, apparatus comprising means forming a channel having a base and sides in one of said sections, said channel extending generally in said certain direction, a guide bearing assembly comprising a support, a main roller carried by said support for movement around a first axis, means carried by said support for engaging the sides of said channel in response to misalignment between said channel and said guide bearing assembly for exerting a torque on said support permitting movement of said roller around a second axis generally mutually perpendicular to said certain direction and to said first axis and means mounting said support on said frame around said second axis with said main roller engaging said channel base and having its axis generally perpendicular to said certain direction.

2. Apparatus as in claim 1 in which said torque exerting means comprises an auxiliary roller and means mounting said auxiliary roller on said support for rotary movement around a third axis generally parallel to and spaced from said second axis and spaced from said first axis to cause said auxiliary roller to exert a torque on said support around said second axis upon engagement with said side in response to misalignment between said surface and said assembly.

3. Apparatus as in claim 1 in which said torque exerting means comprises a pair of auxiliary rollers and means mounting said auxiliary rollers on said support for movement around respective third and fourth axes which are generally parallel to said second axis and which are spaced from said first axis on opposite sides thereof in said direction.

4. Apparatus as in claim 3 in which each of said auxiliary rollers has a diameter approximately equal to the distance between said sides.

5. Apparatus as in claim 1 in which said torque applying means comprises respective first and second pairs of auxiliary rollers, means mounting the rollers of the first pair on said support adjacent to one of said channel sides for rotary movement around respective third and fourth axes which are generally parallel to said second axis and which are spaced therefrom in said direction on opposite sides thereof, and means mounting the rollers of said second pair on said support adjacent to the other channel side for movement around respective fifth and sixth axes generally parallel to said second axis and spaced therefrom in said direction on opposite sides thereof.

6. Apparatus as in claim 1 in which said channel base is a cam track for pivoting said section.

7. Apparatus as in claim 1 in which said support mounting means comprises a torsionally resilient element extending between said frame and said support.

8. Apparatus as in claim 6 in which said element is laminated.

9. Apparatus as in claim 1 in which said mounting means comprises a pivotal connection between said support and said frame.

* * * * *